Jan. 27, 1931.  W. W. TRINKS  1,790,182
COIN CONTROLLED TOWEL CABINET
Filed Dec. 8, 1926   8 Sheets-Sheet 1
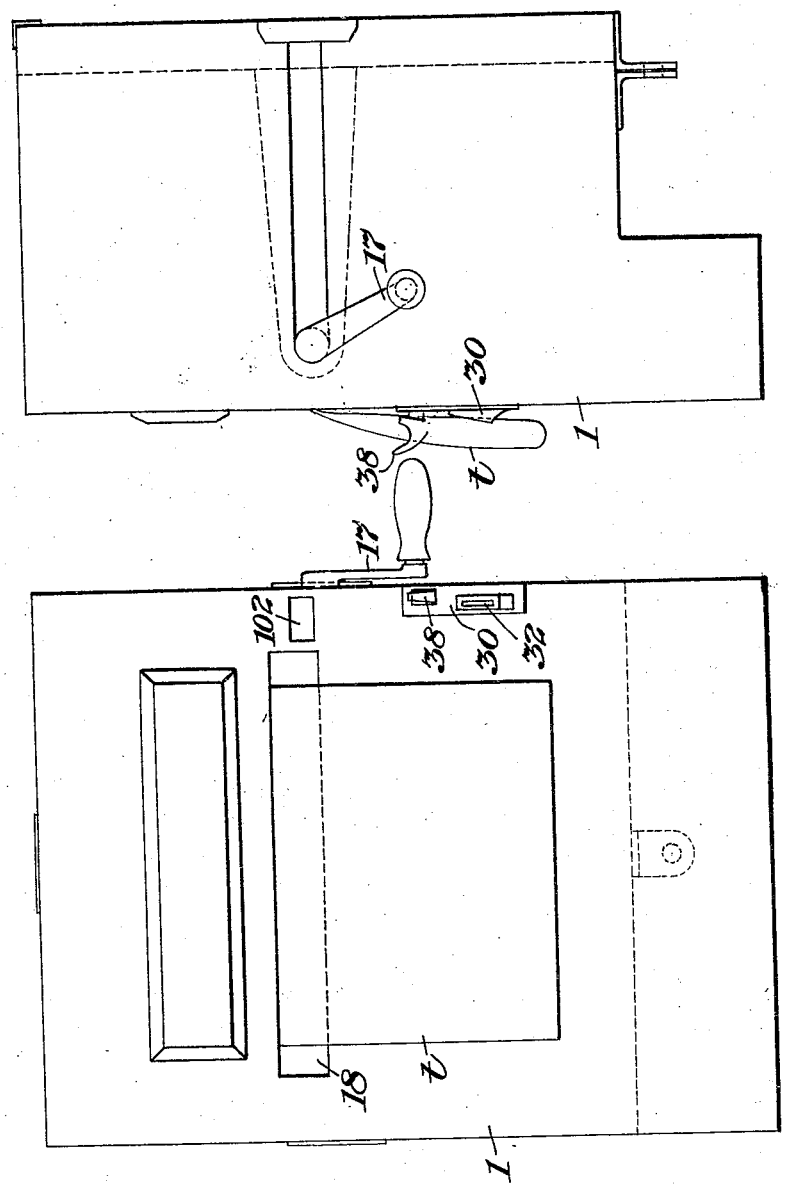
INVENTOR
William W. Trinks
BY
HIS ATTORNEY

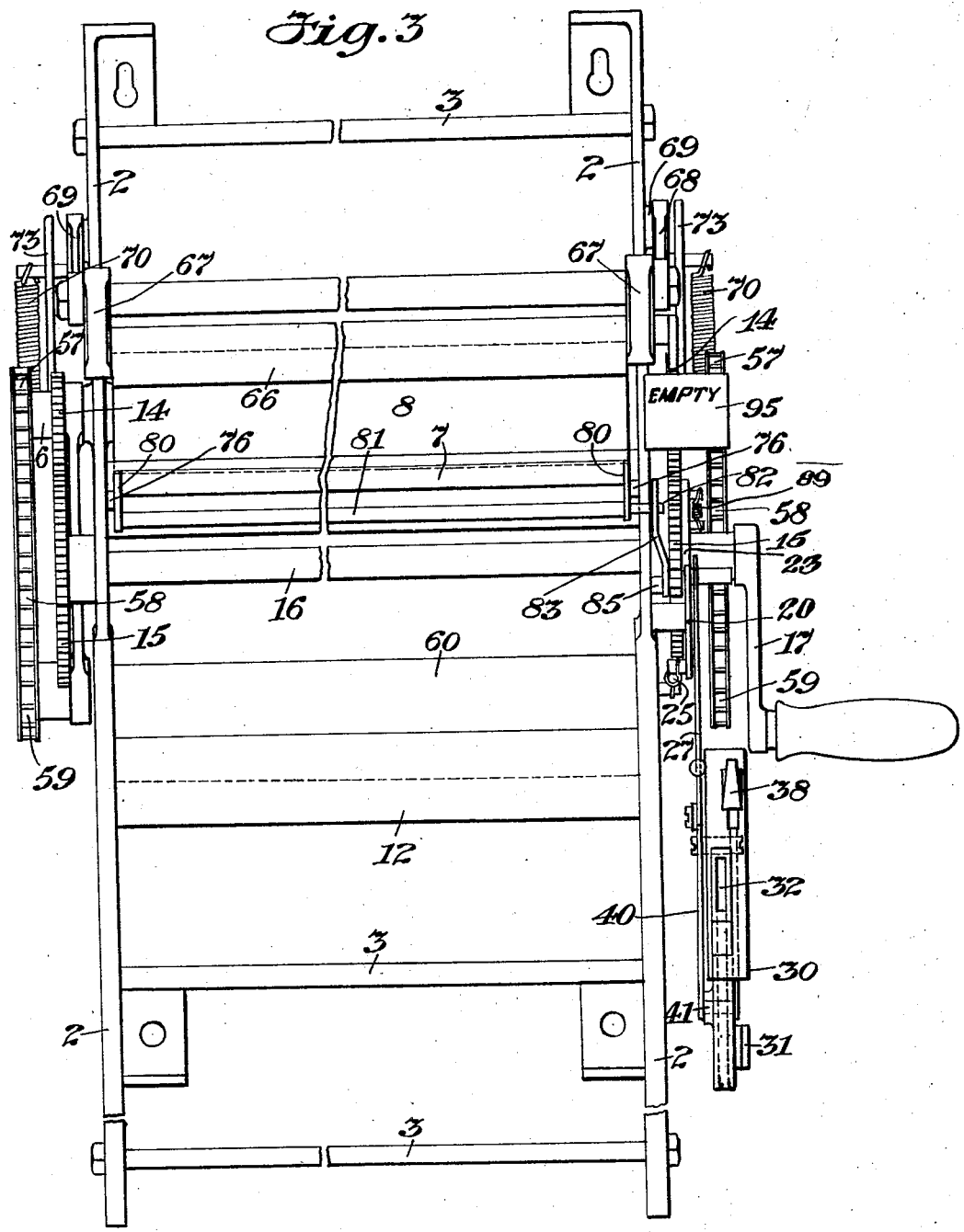

Jan. 27, 1931.  W. W. TRINKS  1,790,182

COIN CONTROLLED TOWEL CABINET

Filed Dec. 8, 1926  8 Sheets-Sheet 3

INVENTOR
William W. Trinks
BY
HIS ATTORNEY

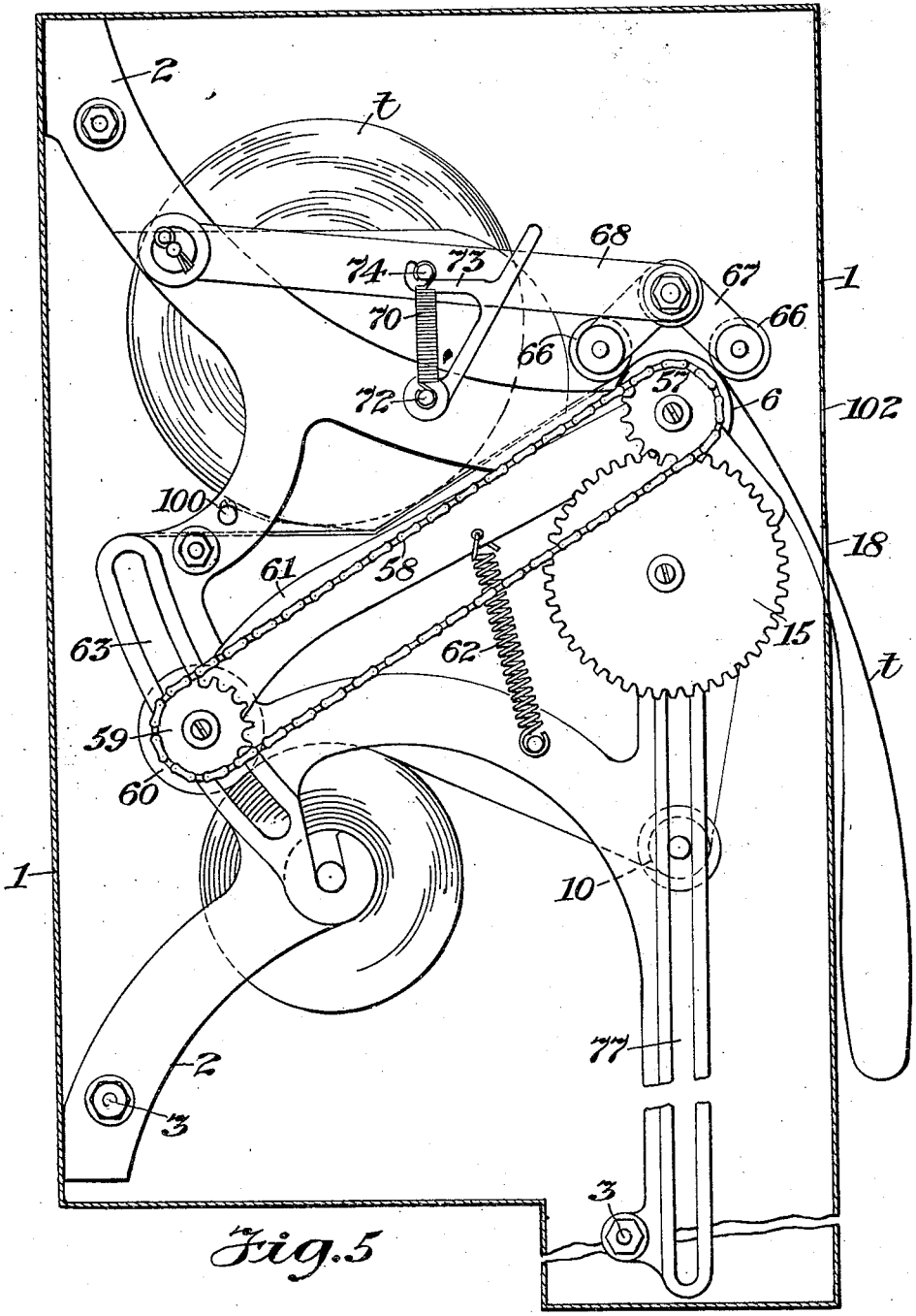

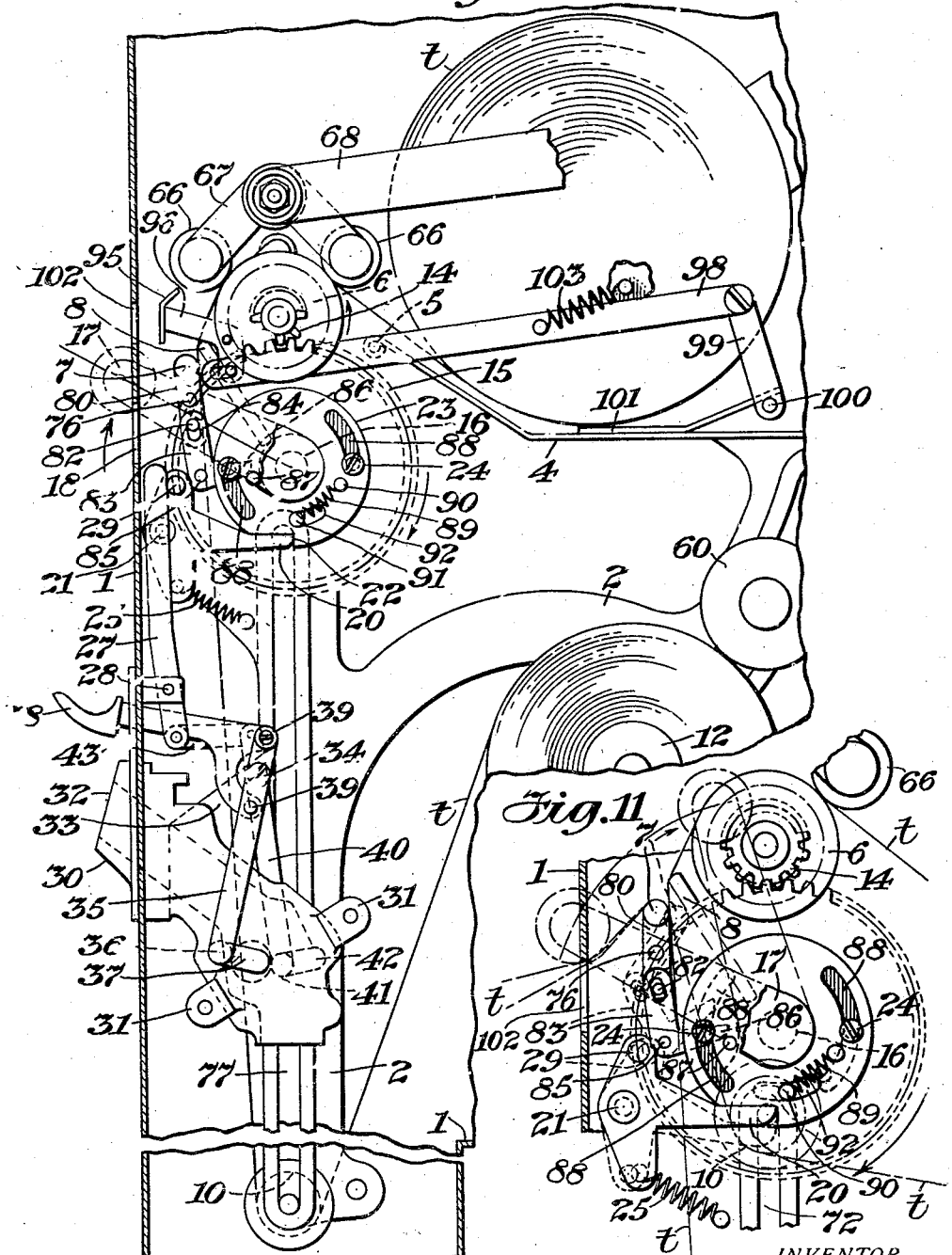

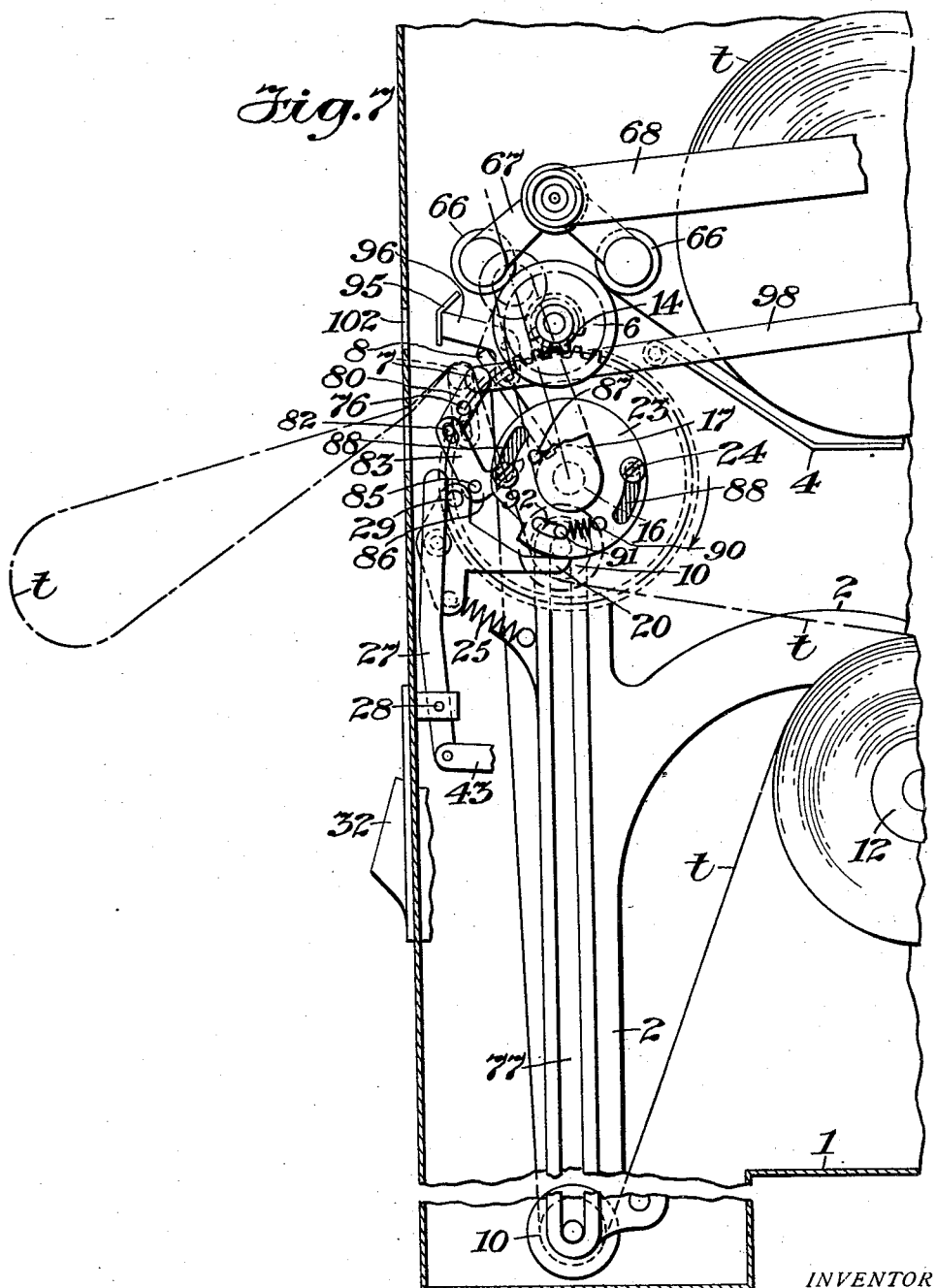

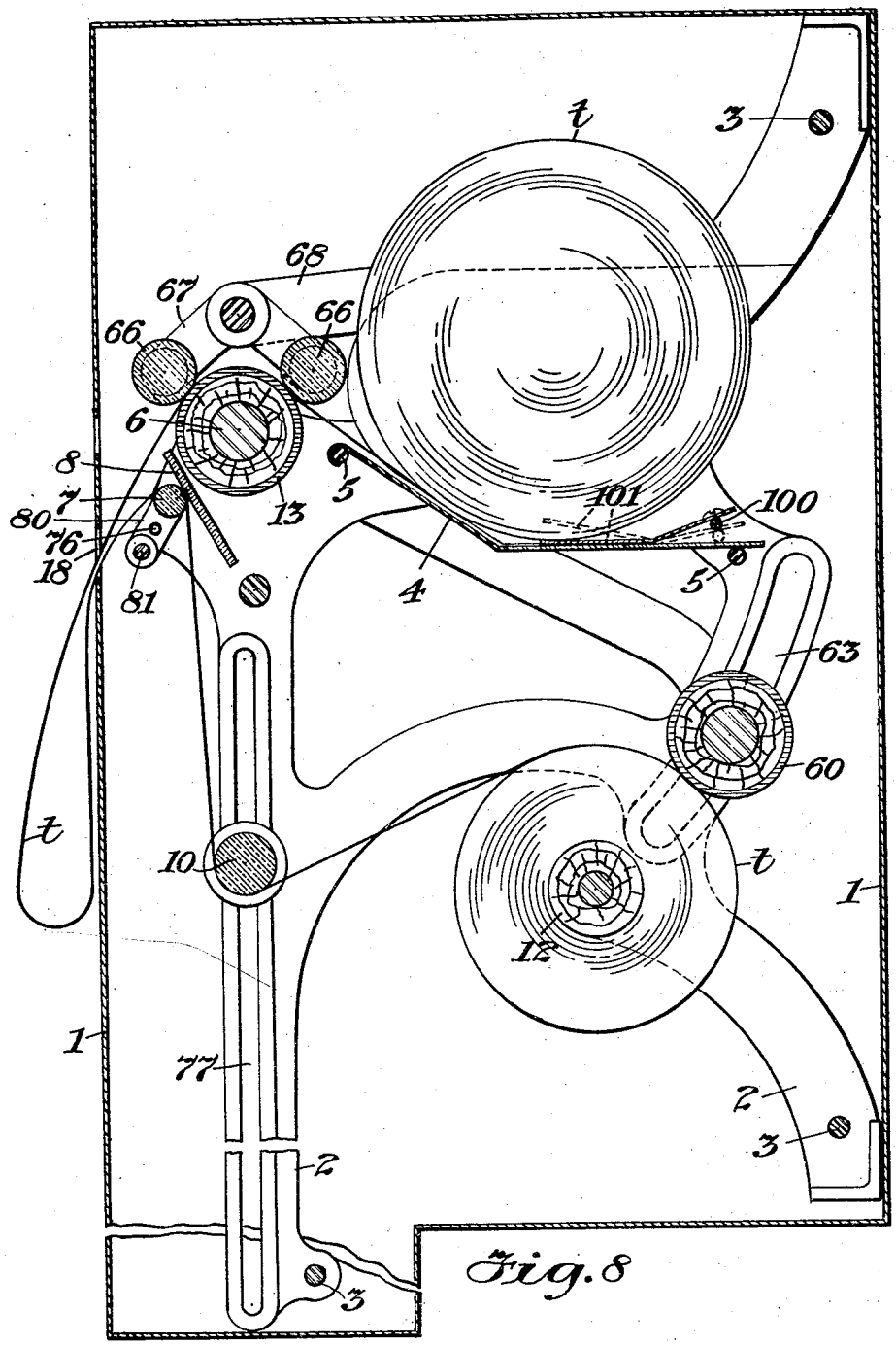

Jan. 27, 1931.  W. W. TRINKS  1,790,182
COIN CONTROLLED TOWEL CABINET
Filed Dec. 8, 1926   8 Sheets-Sheet 8
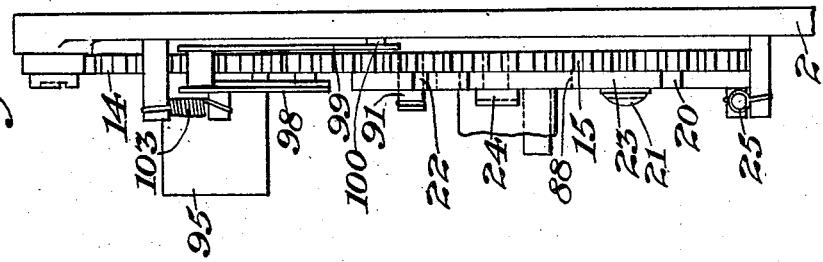
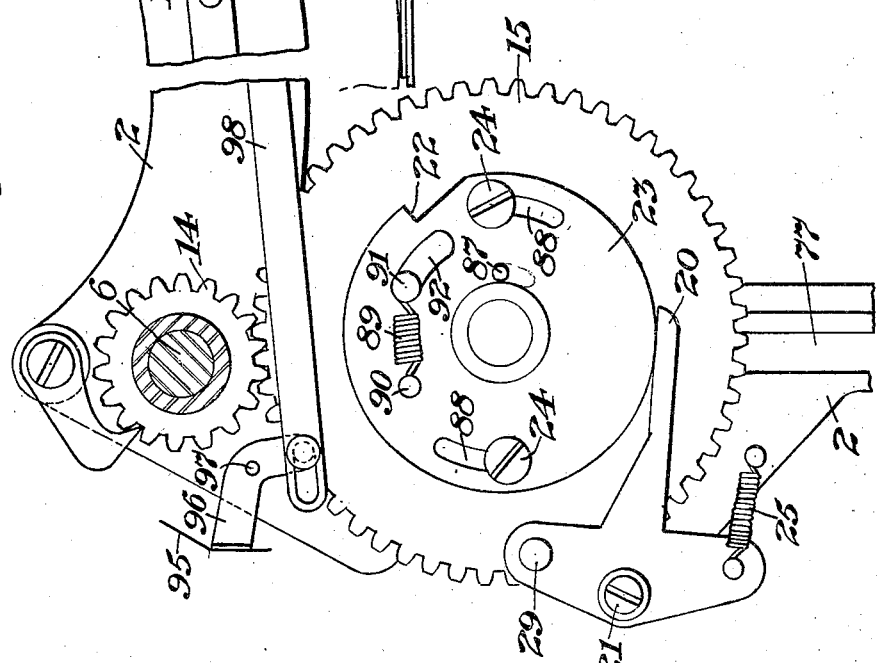
INVENTOR
William W. Trinks
BY
HIS ATTORNEY Patented Jan. 27, 1931

1,790,182

UNITED STATES PATENT OFFICE

WILLIAM W. TRINKS, OF NEW YORK, N. Y., ASSIGNOR, BY DIRECT AND MESNE ASSIGNMENTS, TO PULLCLEAN MANUFACTURING CORPORATION, OF BRIDGEPORT, CONNECTICUT, A CORPORATION OF DELAWARE

COIN-CONTROLLED TOWEL CABINET

Application filed December 8, 1926. Serial No. 153,360.

The invention relates to towel cabinets of the class having provision for feeding predetermined lengths of towel from the cabinet, preferably through the instrumentality of a coin-controlled mechanism, and is in the nature of an improvement upon the cabinet forming the subject of my co-pending application Serial No. 141,914 filed October 16, 1926.

The cabinet of my aforesaid application comprises an outer casing having an opening therein, a feeding mechanism for feeding a length of towel from the casing through said opening, a re-winding mechanism within the casing for re-winding the fed out length of towel, and means in the form of a loose roller engaging the towel at a point between the feeding and re-winding means which is operative to automatically withdraw the fed out length of towel into the casing upon the release of same by the user, whereby there will be no exposed towel at the exterior of the cabinet except during the time of actual use of same by the user.

In this prior cabinet, the loose pull-in roller is raised to its operative position—that is, the position from which it subsequently drops to pull-in the fed out length of towel upon release of the latter by the user—by the pulling action on the towel at one side of the roller by the re-winding means while the towel is held stationary at the opposite side of the roller by the user. This manual part in the operation of the machine is objectionable however for various reasons, one being the liability of the towel slipping from the grasp of the user under the combined weight of the engaging roller and the pulling action of the re-winding means, in which event the fed out length of towel is lost to the user and thereby rendering it necessary to use an additional coin for obtaining another length of towel. To eliminate such manual part in the operation of the machine and render the control or manipulation of the towel pull-in roller entirely automatic and certain, has, therefore, been the main object of the present invention. To accomplish this, I have provided a means for automatically gripping the towel at a point between the feeding and re-winding means and holding the same stationary against the pull of the re-winding means—as done by the user in the machine of my aforesaid application—whereby the pull-in roller will be caused to be raised to its operative position.

Another advantage resulting from such automatic gripping of the towel, which occurs at a point adjacent the towel delivery opening in the casing, is the fact that it assures the delivery of the towel by the feeding mechanism through the opening in the casing in loop form.

Other objects and advantages of the invention will appear and be referred to during the detailed description of the invention which follows.

Referring now to the accompanying drawings—

Fig. 1 is a front elevation of a towel cabinet embodying my invention, showing a length of towel fed therefrom.

Fig. 2 is a side view of the same looking from the right in Fig. 1.

Fig. 3 is a front elevation of the cabinet mechanism, with the outer casing, shown in Figs. 1 and 2, removed.

Fig. 5 is a side view of the same looking from the left as viewed in Fig. 3.

Figs. 6 and 7 are views similar to Fig. 4, but on a reduced scale, showing the positions of the parts at different times in the operation of the machine.

Fig. 8 is a central vertical section through the cabinet.

Fig. 9 is an enlarged detail showing, in side elevation, a part of the towel feeding mechanism and also the towel supply indicating mechanism.

Fig. 10 is an edge view of the parts shown in Fig. 9, looking from the right in that figure.

Fig. 11 is an enlarged detail of the towel gripping device and associated actuating means; the movable member of the gripping device and its actuating means being shown by full lines in towel releasing position and by broken lines in towel gripping position.

Figure 4:
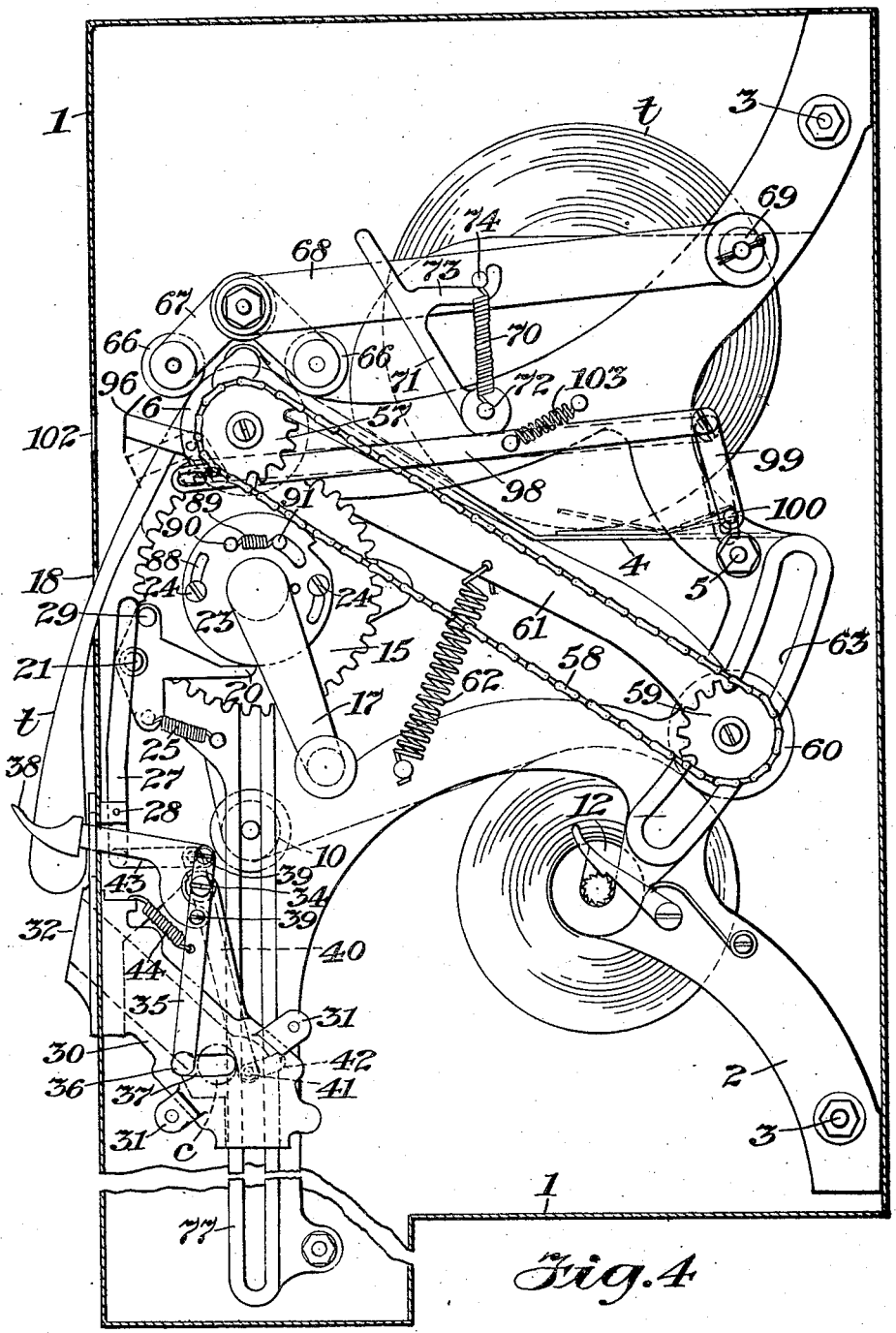
Fig. 4 is a side view of the same, but with the casing in position and in section, looking from the right as viewed in Fig. 3.

The cabinet in the form here shown comprises an outer casing 1, which may be of any suitable construction and design. Within this casing is contained a frame upon which the several parts constituting the towel feeding and re-winding mechanism are mounted. This frame, which may also be of any construction suitable for the purpose, is here shown as comprising two side plates or castings 2, 2, connected by a plurality of tie-rods 3.

The towel t, in roll form, is adapted to be placed within the cabinet on a support 4, which is here shown as a strip of sheet metal supported at its opposite ends by a pair of cross rods 5—5 mounted in the frame plates 2—2. After the towel has been thus positioned in the cabinet, its free end is led over a feed roller 6 adjacent the top of the cabinet, and from thence downwardly between the opposing members 7 and 8 of a gripping device to be presently described. From this gripping device the towel passes on downwardly to and about a loose roller 10, and from thence upwardly and about a re-winding roller 12, upon which the soiled end of the towel is adapted to be automatically wound in about the same ratio as it is fed or drawn off the clean roll.

The feed roller 6, which is preferably provided with a rubber facing 13 (Fig. 8) for frictional engagement with the towel, is journaled at its opposite ends in the frame plates 2—2 and has operative connection at each end through gearing 14—15 with an actuating shaft 16, which latter is also journaled in the frame plates and provided at one end with a rigidly attached crank handle 17. By turning this handle in the proper direction, movement will be imparted to the feed roller through the intermediate gearing to draw a length of towel from the roll of clean towel and feed the same outwardly through the opening 18 in the casing 1. For assuring the feeding movement of the towel by the roller 6, suitable pressure rolls 66, 66, are provided for co-operating with the latter in a manner to be hereinafter referred to.

After a desired predetermined length of towel has been fed through the opening 18, the further movement of the feed roller 6 is brought to a stop. This is accomplished in the present case by means of the engagement of a stop pawl 20 pivotally mounted at 21 on one of the frame plates 2, with a stop shoulder 22 carried on one of the feed gears 15, as shown in Fig. 6. This stop shoulder 22, as here shown, is formed by a notch in the periphery of a disc 23 held to the gear 15 by a plurality of screws 24, and the pawl 20 is yieldingly held by a spring 25 with its free end in contact with the peripheral edge of this disc 23 whereby it will snap into locking engagement with the shoulder 22 when the latter is brought opposite the same by the turning of the handle 17.

When the towel feeding mechanism has been so brought to a stop, it will of course be necessary to release the pawl from its locking engagement with the shoulder 22 before a further length of towel may be fed from the casing. To do this, a coin-controlled mechanism is provided which is operative through the instrumentality of an inserted coin, to operate a suitable pawl releasing member which, as here shown, is in the form of a lever 27 pivotally mounted at 28 on the casing 1 (Fig. 4) with its upper end in position for engagement with a pin 29 on the pawl 20. When this lever 27 is rendered operative by reason of an inserted coin, in a manner to be presently described, it may be pressed into engagement with the pin 29 on the pawl 20 and release the latter from engagement with the stop shoulder 22 and so permit another operation of the towel feeding mechanism, such operation in the present instance being effected by one complete rotation of the gear 15.

As a predetermined length of towel is thus drawn from the roll of clean towel and fed in loop form to a point exterior of the casing as shown, the same operation is utilized to operate the towel re-winding roller 12 in the following manner: The feed roller 6 is provided at its opposite ends with sprocket wheels 57—57 which are operatively connected through chains 58—58 with a second pair of sprocket wheels 59—59 attached to the opposite ends of a pressure roller 60 which cooperates with the re-winding roller 12 to re-wind the soiled towel thereon. This roller 60 is journaled in the end of a pair of swinging arms 61—61 pivotally mounted on hub extensions of the feed roller 6, whereby it may move bodily with respect to the roller 12 to accommodate itself to the increasing diameter of the roll of soiled towel being wound thereon, and it is yieldingly held in cooperative relation to the roller 12 to effect winding of the towel thereon by means of springs 62 connecting with the roller supporting arms, as clearly shown in Fig. 4. As a further means of guiding the pressure roller 60 in its movement radially of the roller 12, the frame plates 2 are provided with arcuate slots 63 through which the end journals of the rollers 60 loosely extend.

As hereinbefore referred to, means are also provided for cooperating with the feed roller 6 for assuring the feed of the towel thereby, these means comprising the pair of pressure rollers 66, 66, supported for engagement with the upper part of the feed roller in journal plates 67 pivotally connected to the free ends of a pair of bracket arms 68, which latter are pivoted to the frame at 69 and engaged by connecting springs 70 in a manner to yieldingly hold the supported rollers 66 in cooperative relation to the feed roller.

To facilitate the threading of the towel between the feed roller and cooperating pressure rollers, means are provided for raising the latter from the feed roller to give an open space therebetween; these means comprising levers 71 pivoted to the frame at 72 and provided with cam surfaces 73 for engagement with pins 74 on the bracket arms 68. These levers when in the normal position shown in Fig. 4 permit the engagement of the pressure roller with the feed roller under the action of the springs 70, but when shifted toward the right from said position, their cam surfaces act to raise the bracket arms and thereby the supported pressure rollers.

The coin-controlled mechanism for operating the pawl 20 to release the towel feeding mechanism may be any suitable for the purpose. In the present case, it comprises a coin-chute 30 adapted to be fastened to the inner wall of the casing at one end thereof, as by means of screws or bolts engaging the same in fastening lugs 31, and arranged with its mouth or receiving end 32 projecting beyond the face of the casing for the convenient insertion of a coin therein. Pivoted to an extension 33 of this chute, at 34, is a lever 35 having at its lower end a pin 36 extending laterally across the chute through an opening 37. This lever has an operating handle 38 fixedly attached thereto at 39—39 with its free end extending outwardly through an opening in the casing to be conveniently reached by the user. Pivoted to the chute extension 33, but at that side opposite the lever 35, is a second lever 40, which latter is also provided at its lower end with a pin 41 extending laterally across the chute through on opening 42 therein and in position opposite the pin 36 of the first lever. This second lever is connected at its upper end with the lower end of the pawl releasing lever 27 through a connecting link 43. A spring 44 connecting with the lever 35 yieldingly holds the same in the normal position shown in Figs. 4 and 6, with its pin 36 in spaced relation to the pin 41 to receive a coin therebetween and with its handle 38 raised. With this mechanism, the movement of the handle 38 will be ineffective to operate or release the pawl 20 unless a coin be inserted through the chute to a position between the pins 36 and 41, but in such event, the inserted coin, as indicated at c in dotted lines, will cause movement to be imparted to the lever 40 and thereby operate the lever 27 to effect release of the pawl 20 from its engagement with the shoulder 22 and so permit operation of the towel feeding mechanism.

In the operation of the machine as thus far described, the user desiring a length of towel will insert a coin of the proper denomination into the chute 30 and then depress the handle 38 to effect the release of the towel feeding mechanism. Thereupon the user will grasp the feed actuating handle 17 and turn the same to effect the feeding out of a clean length of towel and the re-winding of the soiled towel, these two operations taking place simultaneously as hereinbefore described. Preliminary to such feeding and re-winding operations, however, the towel will have been gripped by the gripping members 7 and 8 which are automatically brought into action simultaneously with the release of the feeding mechanism by means to be presently described. When the towel is thus gripped, the operation of the feeding mechanism will cause the towel to be delivered in loop form through the opening in the casing as shown, and at the same time the action of the re-winding mechanism in rolling or taking up the soiled end of the towel will raise the engaging roller 10 from its normally lowered position shown in Figs. 6 and 7, to the partially raised position shown in Fig. 8; this raising of the roller by the re-winding mechanism being effected by reason of the towel beng held stationary at one point by the gripping device 7—8. After the parts have been brought to the positions shown in Fig. 8, or substantially so, the machine will have been brought to a stop by the engagement of the pawl 20 with the stop shoulder 22. At this time the user will release the actuating handle and grasp the feed out length of towel, pulling outwardly on the latter, as indicated by the broken line in Fig. 7, which pulling action will rock the gripping member 7 on its pivot support 76 outwardly from gripping relation with the stationary member 8, also as shown by broken lines in Fig. 7. This pulling of the towel in effecting its release from the gripping device causes a further slight raising of the roller 10, from the position shown in Fig. 8 to that shown by dotted lines in Fig. 7. The towel will now remain released during use of the same, following which and upon its release by the user, the roller 10 will again drop to its lowered position and pull the used or soiled length of towel into the casing, as shown in Fig. 6. The roller 10 is preferably guided in its described vertical movements by guides 77 in the opposite frame plates in which the ends of the roller engage.

I will now describe in detail the gripping device 7—8 and its operating means. This device comprises the stationary member 8, in the form of a flat plate or board extending across the full width of the machine and attached at its opposite ends to the end frames 2—2, and the cooperating movable member 7 which is in the form of a bar carried at its ends in two bracket plates 80—80 pivotally mounted at 76—76 on the end frames 2—2. In order to hold the said bracket plates in fixed relation to each other, they are further connected at their lower ends by a tie-rod 81 which, at one end thereof, extends laterally beyond the adjacent bracket plate, as at 82, for engagement with one arm of an elbow lever 83 within an elongated slot 84 therein, said lever being pivoted to the frame at 85 and arranged with its other arm 86 extending into position for engagement by a pin 87 on the disc 23, which pin 87 projects from the disc through a slot (not shown) in the gear 15. The disc 23 is held to its said position on the gear 15 for independent rotary movement thereon for a purpose to be presently described by means of the headed screws 24 which are tapped into the gear and engage the disc 23 through elongated arcuate slots 88 therein. A spring 89 connecting at one end with a pin 90 on the disc and at its opposite end with a pin 91 on the gear, also extending outwardly through an arcuate slot in the disc, acts to yieldingly hold the disc in a normal position on the gear with one end wall of the arcuate slots in contact with the holding screws extending therethrough, as shown in Figs. 4, 7 and 9. Now in the operation of the feeding mechanism, when the gears 15 have been turned by the handle 17 to the point where the pawl 20 snaps into engagement with the disc shoulder 22, the disc will be brought to a stop with the attached pin 87 at or adjacent the under side of the lever arm 86, as shown in Figs. 6 and 11, but a continuous movement of the gear is permitted through an arc equal to the length of the slots 88 and during which the screws 24 move from one end of the slots 88 to the other, as shown in Fig. 6, at which time the gear is of course brought to a stop. Such continued movement of the gear following the stopping of the disc, which also moves the pin 91 to the opposite end of its slot 92, thereby places the spring 89 under tension, as also shown in Fig. 6, whereby, immediately upon release of the disc by the pawl 20 as effected by the coin-controlled releasing mechanism and preliminary to the operation of the towel feeding and re-winding mechanism by the handle 17, the disc will be automatically given a partial turn under the action of the spring 89 and thereby rock the lever 83 on its pivot through the engagement of the disc pin 87 therewith, which movement of the lever 83, through the described connection of the same with the movable gripping member 7, will throw the latter into gripping relation with the stationary member 8 and grip the interposed towel therebetween. Such action of the parts in effecting the movement of the gripping member 7 from its releasing position shown in Fig. 6, to its gripping position shown in Fig. 7, is clearly shown in these two figures and also in Fig. 11. After the member 7 has been swung over to the right of its pivot against the member 8, it will be retained in such gripping position under its own weight, as will be clear by reference to Figs. 7 and 8. Subsequently, during the towel feeding and re-winding operations, the member 7 will be held in close gripping relation to the member 8 by the downward pull thereon of that section of the towel engaged by the roller 10. The movement of the disc 23 in effecting the described operation of the gripping device is of course limited by the screws 24 on the gear 15, which are engaged by the opposite end walls of the slots 88 when the disc is advanced by the spring 89 as described.

The cabinet is also provided with means for automatically indicating when the supply of towelling is exhausted. This comprises an indicator plate 95, preferably bearing on its face the word "Empty" (Fig. 3), attached to one end of an elbow lever 96 pivoted to one of the end frames at 97, which lever is operatively connected through a link 98 with a rocker arm 99 on one end of a shaft 100, which latter is journaled at its opposite ends in the end frame plates 2—2 and provided with a rigidly attached plate 101 partially overlying the towel support 4 in position to receive the roll of clean towel thereon as shown. When the plate 101 is depressed under the weight of the roll of towel thereon, the indicator plate 95 will be held through the intermediate connections in a raised or invisible position with respect to an opening 102 in the casing 1, but upon the supply of towel becoming exhausted and thereby relieving the plate 101 from the weight of same, the parts are shifted under the action of a spring 103 connecting with the link 98, from the full line position to the broken line position shown in Fig. 4, which acts to lower the indicator plate and bring the word "Empty" at the upper part thereof to a visible position opposite the opening 102 in the casing.

What I claim is:

1. In a towel cabinet, the combination with a casing having an opening therein, of means for feeding a length of towel from the casing through said opening, means for alternately gripping and releasing the towel at a point in advance of said feeding means, and means rendering said gripping means effective during the operation of said feeding means.

2. In a towel cabinet, the combination with a casing having an opening therein, of means for feeding a length of towel from the casing through said opening, means for alternately gripping and releasing the towel at a point in advance of said feeding means, and means rendering said gripping means effective in advance of and during the operation of the feeding means.

3. In a towel cabinet, the combination with a casing having an opening therein, of means for feeding a length of towel from the casing through said opening, means for rewinding the towel fed from the casing, and means for alternately gripping and releasing the towel at a point between the feeding and rewinding means, said gripping means being effective during the operation of the feeding and re-winding means.

4. In a towel cabinet, the combination with a casing having an opening therein, of means for feeding a length of towel from the casing through said opening, means for rewinding the towel fed from the casing, and means for alternately gripping and releasing the towel at a point between the feeding and rewinding means, said gripping means being operative in advance of and during the action of the feeding means.

5. In a towel cabinet, the combination with a casing having an opening therein, of means for feeding a length of towel from the casing through said opening, means for rewinding the towel fed from the casing, means operatively connecting the feeding and re-winding means for effecting their operation in unison, and means for alternately gripping and releasing the towel at a point between the feeding and re-winding means, said gripping means being effective during the operation of the feeding and re-winding means.

6. In a towel cabinet, the combination with a casing having an opening therein, of means for feeding a length of towel from the casing through said opening, means for re-winding the towel fed from the casing, means operatively connecting the feeding and re-winding means for effecting their operation in unison, and means for alternately gripping and releasing the towel at a point between the feeding and re-winding means, said gripping means being operative in advance of and during the action of said feeding and re-winding means.

7. In a towel cabinet, the combination with a casing having an opening therein, of means for feeding a length of towel from the casing through said opening, means for re-winding the towel fed from the casing, means effective during the operation of the feeding and re-winding means for gripping and holding the towel at a point between said feeding and re-winding means and adapted to be released by a pull on the towel, and a weight loosely engaging the towel between the gripping and re-winding means and operable to be raised by the pulling of the towel as effected by the re-winding means and to thereafter drop and pull the fed out length of towel into the casing following release of the towel by said gripping means.

8. In a towel cabinet, the combination with a casing having an opening therein, of means for feeding a length of towel from the casing through said opening, means for re-winding the towel fed from the casing, means operatively connecting the feeding and re-winding means for effecting their operation in unison, means for gripping and holding the towel at a point between the feeding and re-winding means and adapted to be released by a pull on the towel, and a weight loosely engaging the towel between the gripping and re-winding means and operable to be raised by the pulling of the towel as effected by the re-winding means and to thereafter drop and pull the fed out length of towel into the casing following release of the towel by said gripping means.

9. In a towel cabinet, the combination with a casing having an opening therein, of means for feeding a length of towel from the casing through said opening, towel pulling means within the casing, means for alternately gripping and releasing the towel at a point between the feeding and pulling means and being effective to grip and hold the towel during the action of the feeding means, and means rendered operable by said towel pulling means to withdraw said fed out length of towel into the casing upon release of same by the user.

10. In a towel cabinet, the combination with a casing having an opening therein, of means for feeding a length of towel from the casing through said opening, towel pulling means within the casing, means for alternately gripping and releasing the towel at a point between the feeding and pulling means and being effective to grip and hold the towel during the action of the feeding means, and gravity acting means rendered operable by said towel pulling means to withdraw said fed out length of towel into the casing upon release of same by the user.

11. In a towel cabinet, the combination with a casing having an opening therein, of means for feeding a length of towel from the casing through said opening, towel pulling means within the casing, means effective during the operation of the feeding and pulling means for gripping and holding the towel at a point between said feeding and pulling means and adapted to be released by a pull on the towel, and a loose roller engaging the towel at a point between the gripping and pulling means and rendered operable by said towel pulling means to withdraw said fed out length of towel into the casing upon releasing of same by the user.

12. In a towel cabinet, the combination with a casing having an opening therein, of means for feeding a length of towel from the casing through said opening, two cooperative gripping members for gripping the towel therebetween at a point in advance of the feeding means and adapted to be released by a pull on the towel, and means rendering said gripping means effective during the operation of the feeding means.

13. In a towel cabinet, the combination with a casing having an opening therein, of means for feeding a length of towel from the casing through said opening, two cooperative gripping members adapted to grip the towel therebetween at a point in advance of the feeding means, one of said members being mounted for movement to and from its position of gripping relation with the other and adapted to be released by a pull on the towel, and means rendering said gripping means effective during the operation of the feeding means.

14. In a towel cabinet, the combination with a casing having an opening therein, of means for feeding a length of towel from the casing through said opening, two cooperative gripping members adapted to grip the towel therebetween at a point in advance of the feeding means, one of said members being mounted for movement to and from its position of gripping relation with the other and adapted to be released by a pull on the towel, and automatic means for rendering said members effective to grip the towel during the operation of the feeding means.

15. In a towel cabinet, the combination with a casing having an opening therein, of means for feeding a length of towel from the casing through said opening, and two cooperative gripping members adapted to grip the towel therebetween at a point in advance of the feeding means, one of said members being mounted for movement to inoperative or towel releasing position under the pulling action of the towel thereagainst.

16. In a towel cabinet, the combination with a casing having an opening therein, of means for feeding a length of towel from the casing through said opening, and two cooperative gripping members for gripping the towel therebetween at a point in advance of the feeding means, one of said members being pivotally mounted whereby it may be moved to inoperative or towel releasing position under the pulling action of the towel thereagainst.

17. In a towel cabinet, the combination with a casing having an opening therein, of means for feeding a length of towel from the casing through said opening, means for alternately gripping and releasing the towel at a point in advance of the feeding means, and automatic means operative subsequent to the release of said gripping means to render the latter effective to grip the towel during the operation of the feeding means.

18. In a towel cabinet, the combination with a casing having an opening therein, of means for feeding a length of towel from the casing through said opening, means for alternately gripping and releasing the towel at a point in advance of the feeding means, and automatic means operative subsequent to the release of said gripping means to render the latter effective to grip the towel in advance of and during the action of the feeding means.

19. In a towel cabinet, the combination with a casing having an opening therein, of means for feeding a length of towel from the casing through said opening, means for re-winding the towel, means operatively connecting the feeding and re-winding means for causing them to operate in unison, means for gripping the towel at a point between the feeding and re-winding means, said means being adapted for movement to releasing position by a pull on the towel, a weight loosely engaging the towel at a point between the gripping and re-winding means and being raised to operative position by the towel under the pulling action of the re-winding means, and automatic means for rendering the gripping means effective to grip the towel in advance of and during the action of the feeding and re-winding means, the said weight being operative to drop and pull in the fed out length of towel following the release of the towel by said gripping means.

20. In a towel cabinet, the combination with a towel feeding means, of a towel gripping means movable to inoperative position under a pull on the towel, and means operative to render said gripping means effective during the operation of the feeding means.

21. In a towel cabinet, the combination with a towel feeding means, of a towel gripping means movable to inoperative position under a pull on the towel, and means operative to render said gripping means effective in advance of and during the operation of the feeding means.

22. In a towel cabinet, the combination with a towel feeding means and a towel re-winding means, of towel gripping means movable to inoperative position under a pull on the towel and located intermediate the feeding and re-winding means, and means operative to render said gripping means effective during the operation of the feeding and re-winding means.

23. In a towel cabinet, the combination with a towel feeding means and a towel re-winding means, of a gripping means for gripping the towel intermediate the feeding and re-winding means and including a member movable to inoperative position under a pull of the towel, and means operative to render said gripping means effective in advance of and during the operation of the feeding and re-winding means.

24. In a towel cabinet, the combination with a towel feeding means, of means for gripping the towel at a point in advance of the feeding means, said gripping means being normally inoperative, and means operative to effect the operation of said gripping means in advance of and during the operation of the feeding means.

25. In a towel cabinet, the combination with a towel feeding means, of means for gripping the towel at a point in advance of the feeding means, said gripping means comprising a pivoted member for movement to and from operative gripping position and being normally inoperative, and means operative to move said gripping member to gripping position in advance of the operation of the feeding means, said member being movable to releasing position under a pull on the towel.

26. In a towel cabinet, the combination with a towel feeding means, of means for gripping the towel at a point in advance of the feeding means and including a member movable to releasing position under a pull on the towel, a spring-actuated member for rendering said gripping means effective, and means for controlling the action of said member and rendering it effective in advance of the operation of the feeding means.

27. In a towel cabinet, the combination with a towel feeding means, of means for alternately gripping and releasing the towel at a point in advance of the feeding means, a spring-actuated member for rendering said gripping means effective, and means for controlling the action of said member and rendering it effective in advance of the operation of the feeding means.

28. In a towel cabinet, the combination with a towel feeding means, of means for gripping the towel at a point in advance of the feeding means, a spring-actuated member adapted for movement to render said gripping means effective during operation of the feeding means, and means associated with the feeding means to restore said spring-actuated member to normal position.

29. In a towel cabinet, the combination with a towel feeding means, of means for gripping the towel at a point in advance of the feeding means, a spring-actuated member for rendering said gripping means effective, a detent normally holding said member against the pressure of its actuating spring, and means for releasing said detent and rendering said member effective to operate the gripping means in advance of and during the action of the feeding means.

30. In a towel cabinet, the combination with a towel feeding means including a movable member, of means for gripping the towel at a point in advance of the feeding means, a spring-actuated member carried by said movable member of the feeding means for rendering said gripping means effective during the operation of the feeding means, a detent engaging said spring-actuated member and holding it against the pressure of its actuating spring, and means for releasing said detent and rendering said spring-actuated member effective to operate the gripping means in advance of the action of the feeding means.

In testimony whereof I affix my signature.

WILLIAM W. TRINKS.